United States Patent [19]

Mayer, Jr. et al.

[11] 3,889,056

[45] June 10, 1975

[54] VIDEO SIGNATURE DECODER AND COMPARATOR AND METHOD

[75] Inventors: George L. Mayer, Jr., New Orleans, La.; David L. Dobbins, Austin, Tex.

[73] Assignee: Coded Signatures, Inc., New Orleans, La.

[22] Filed: July 10, 1972

[21] Appl. No.: 270,053

[52] U.S. Cl. ..... 178/6.8; 178/DIG. 1; 178/DIG. 23; 356/71; 356/165

[51] Int. Cl. ..... H04n 7/18

[58] Field of Search..... 178/DIG. 1, DIG. 3, DIG. 6, 178/DIG. 23, 7.9, 7.91, 5.1; 350/167; 356/162, 163, 165, 166, 168, 71, 72, 73; 250/557; 355/91

[56] References Cited

UNITED STATES PATENTS

| | | | |
|---|---|---|---|
| 57,083 | 8/1866 | Campbell | 355/91 |
| 1,478,828 | 12/1923 | Jones | 355/91 |
| 1,702,232 | 2/1929 | Koppe | 355/91 |
| 1,978,493 | 10/1949 | Huebner | 355/91 |
| 3,086,121 | 4/1963 | Cockrell | 250/557 |
| 3,283,071 | 11/1966 | Rose | 178/DIG. 1 |
| 3,320,430 | 5/1967 | Gorman | 250/557 |
| 3,589,514 | 6/1971 | Townsend | 250/557 |
| 3,178,993 | 4/1965 | Ferris et al. | 350/167 |
| 2,648,723 | 8/1953 | Goldsmith | 356/71 |
| 2,568,166 | 9/1951 | Perry | 178/DIG. 6 |
| 2,294,809 | 9/1942 | Smith | 178/DIG. 1 |
| 3,571,509 | 3/1971 | Cross | 178/7.9 |
| 3,472,951 | 10/1969 | Shimada et al. | 178/DIG. 23 |
| 3,389,221 | 6/1968 | MacDonald | 178/DIG. 29 |

OTHER PUBLICATIONS

Griffiths and Nettles, IBM Technical Disclosure Bulletin, Vol. 14, No. 12, page 3668, May 1972.
"Minusca TV Subtraction Apparatus" Old Delft–Holland
Western Electric "How Western Electric Spots Dots With TV," June, 1970, Scientific American, page 87.

*Primary Examiner*—Howard W. Britton
*Assistant Examiner*—Michael A. Masinick

[57] ABSTRACT

Apparatus and method for decoding recorded encoded data for viewing and visual comparison with other matter on a television screen. The method comprises utilizing a multiple-array lens, otherwise known as a "fly's eye" lens for "unscrambling" data that has been encoded, or "scrambled," by a similar lens and recorded on a document (a signature on a bank check, for example). In instances where the encoded data has been recorded on a reduced scale, magnifying means is included to enlarge the encoded data to its original size during the decoding thereof.

41 Claims, 11 Drawing Figures

VIDEO SIGNATURE DECODER AND COMPARATOR AND METHOD

The apparatus includes a monitor, or television set, a first television camera arranged to scan the decoded data and to transmit the same for viewing on the lower portion of the video screen of the monitor, and a second television camera arranged to scan matter to be compared with the decoded data and to simultaneously transmit the same to the upper portion of said video screen. Control knobs associated with the monitor are adjustable to shift the lower image vertically and horizontally relative to the upper image, and to superimpose the lower image upon the upper image, if desired, to facilitate comparison of the corresponding characters of the two images. The apparatus can be connected with one or more remote monitors, located, for example, in a signature card file room, to enable independent visual verification of the authenticity of a signature to be made by direct comparison with the original signature on a card.

The invention also contemplates a more economical device wherein a single television camera is employed to transmit to a monitor an image of both the decoded data and the matter to be compared therewith.

FIELD OF THE INVENTION

The present invention relates to apparatus for decoding recorded encoded data for viewing and comparison with other matter on a video screen. By way of specific example, and not limitation, the present disclosure illustrates and describes apparatus for the decoding and visual viewing and comparison, on a video screen, of an encoded signature with the same signature in handwritten form. By way of further example, and not limitation, the disclosure is directed to an encoded signature appearing on a bank check, and comparison of the decoded signature with a handwritten signature appearing on the same check. This enables a bank teller to instantly compare the encoded signature with the handwritten signature on the check to determine whether the handwritten signature is authentic or a forgery. This procedure eliminates the time now wasted in banks and other institutions in comparing a handwritten signature on a check with that on a signature card.

DESCRIPTION OF THE PRIOR ART

In our prior application, Ser. No. 103,204, filed on Dec. 31, 1970, we have disclosed an apparatus and method for encoding data, printing the encoded data on a document, decoding the printed data and presenting the same for viewing on an opaque screen. Our prior apparatus also includes means for projecting an image of handwritten data onto the opaque screen for comparison with the image of the decoded data. The apparatus is quite satisfactory in that it presents the decoded data for simultaneous viewing with the handwritten data, but the reproduced images fixed in position on the screen upon which they have been projected. Comparison, therefore must be made visually, without the benefit of being able to superimpose one image upon the other. Also with our prior apparatus and method, the images could not be transmitted to a remote monitoring point for comparison with additional data.

SUMMARY OF THE INVENTION

In contrast with the foregoing, the present invention makes it possible for the viewer to observe the decoded data and to compare it with other data, and to superimpose one upon the other for precise character comparison. In the case of bank checks, the precise comparison of the letter characters comprising the signature enables unmistakable detection of forgery. With the present invention, the apparatus that decodes the encoded data and reproduces it on a video screen, along with matter to be compared with the decoded data, can be connected with a master monitor or any desired number of monitors located at remote points to thereby enable one or more persons to simultaneously and independently view the same images. This is a great convenience in a bank, for example, in instances where a teller is uncertain that the signature on the check is authentic. With the present apparatus, the teller is able to effect transmission of the images to a master monitoring screen in a room where the signature cards are kept, and have someone else in authority compare the original signature on a card with the handwritten signature on the remote monitor. Signaling means such as a buzzer can be sounded to alert the person in attendance at the remote monitor to look at the screen, or to turn the monitor on. Additional signal means in the form of "Yes" and "No" lights can be provided to authorize the teller to accept or reject the check, in accordance with the conclusion of the remote viewer.

More specifically, in the case of the bank check, upon presentation to a teller for acceptance or cashing, the handwritten signature can be compared with the encoded signature on the check by placing the check in a slot in the side of the cabinet of the apparatus in the path of the lenses of two television cameras, one of which transmits an image or picture of the encoded signature after decoding, and the other one of which transmits an image or picture of the handwritten signature as it appears on the check. Both television cameras transmit their images to the same screen of a monitor for comparison and viewing by the teller before accepting or rejecting the check. Forgery is thus readily revealed if there is suspicious disparity between the decoded signature and the handwritten signature.

The present apparatus also includes control knobs for effecting horizontal and vertical adjustment of one image relative to the other on the video screen. This makes it possible to superimpose one image on the other to enable exact comparison.

The present system is a great convenience and timesaver for banks, savins and loan associations, etc., because it eliminates the time wasted in pulling a signature card from the files for verification of the signature on the check. It also affords the advantnage of being able to transmit the decoded signature and the handwrittenn signature to a remote point, such as to a master monitor in a signature card room.

One type of apparatus, according to the invention, provides for positioning the check in the cabinet thereof in an inverted position with the encoded signature thereon in confronting relation with the array side of the "fly's eye" decoding lens. The check is held flat against a backing plate by a suction device that operates continuously when the apparatus is in use. If the encoded signature is reduced to about half-size in encoding the same, then a magnifying lens is positioned close to the "flys's eye" lens to magnify the decoded image appearing on the adjacent side of the "fly's eye" lens to about twice its size, so that the reproduction of the encoded signature as viewed by the first television camera is substantially the same size that it was at the time of encoding. The hand-written signature on the inverted check assumes a position in front of a plain window and is scanned by the second television camera without an interposed magnifying lens. Of course, the lenses on the television cameras can be such as to enlarge the images transmitted to the monitor to any size desired, but in any event the lens systems employed in the two cameras preferably have the same power of magnification.

Illumination for the television cameras is provided by suitable lamps, which are turned on continuously when the apparatus is in use. An electric eye is responsive to the light from the lamps and is connected in a circuit with the television cameras so that the cameras are energized only if the lights are on. This prevents damage to the vidicon tube of the cameras, which draws excessively high current if operated under inadequate lighting conditions. The television cameras are synchronized so that they start simultaneously and scan their objectives in unison.

The video signals from the two television cameras are fed to a conventional video mixer and the combined signals from the mixer are supplied to the video input of a television set, or monitor. For present purposes the audio components of the monitor can be omitted. The combined signals can also be supplied to one or more remotely located monitors that can be manually tuned on or off at will.

The monitor is of the "instant-on" type and is deenergized except when a check is positioned in the apparatus. However, it is to be understood that current is supplied to the filament of the monitor tube from the time that the apparatus is turned on. Another electric eye, which is also responsive to the light from the lamps, is located so that the activating light is automatically interrupted by a check when inserted into the apparatus. This electric eye controls the monitor, in that it is so connected in circuit therewith that, when deenergized, it actuates a conventional relay to supply conventional line current to the components of the monitor, other than the filaments When the check is withdrawn from the apparatus, the relay is energized and current to the monitor is automatically cut off, except for the filament current.

A modified and simpler embodiment of the invention includes a single television camera arranged to scan both the decoded data and the matter to be compared therewith. The video signals from the camera are transmitted to the video input of the monitor. In such embodiment, the images on the video screen must be visually compared without the benefit of superimposing one image upon the other.

Accordingly, the principal object of the invention is to provide a method and apparatus for decoding recorded encoded data and reproducing the decoded data for video viewing.

Another object is to provide a simple method and apparatus for simultaneously decoding recorded encoded data and reproducing the decoded data, together with data to be compared with it, on a television screen.

Another object is to provide a method and apparatus for decoding recorded encoded data by utilizing a multiple-array, or "fly's eye," lens and reproducing the decoded image on a television screen.

Another object is to provide a method and apparatus for decoding recorded encoded data and displaying the decoded data on a television screen for comparison with other matter displayed on said screen.

A specific object is to provide a method and apparatus for decoding the signature on a bank check to enable bank tellers, and the like, to quickly verify the authenticity of the handwritten signature on the check, without being required to examine the original signature on the bank's signature card.

A further object is to provide a method and apparatus for decoding an encoded signature and enabling comparison of the decoded signature with the handwritten counterpart of the encoded signature displayed on a television screen at a remote location.

Still another object is to provide a method and apparatus for decoding encoded signatures with direct viewing of the decoded signature on a closed circuit video screen.

A still further object is to provide a method and apparatus for reproducing an image of a decoded signature and an image of a handwritten signature, and wherein one image can be superimposed upon the other for comparison purposes.

Other objects and advantages of the invention will be apparent from the following description taken in conjunction with the accompanying drawings.

DESCRIPTION OF THE PREFERRED EMBODIMENTS

Figures 1, 2, 3:
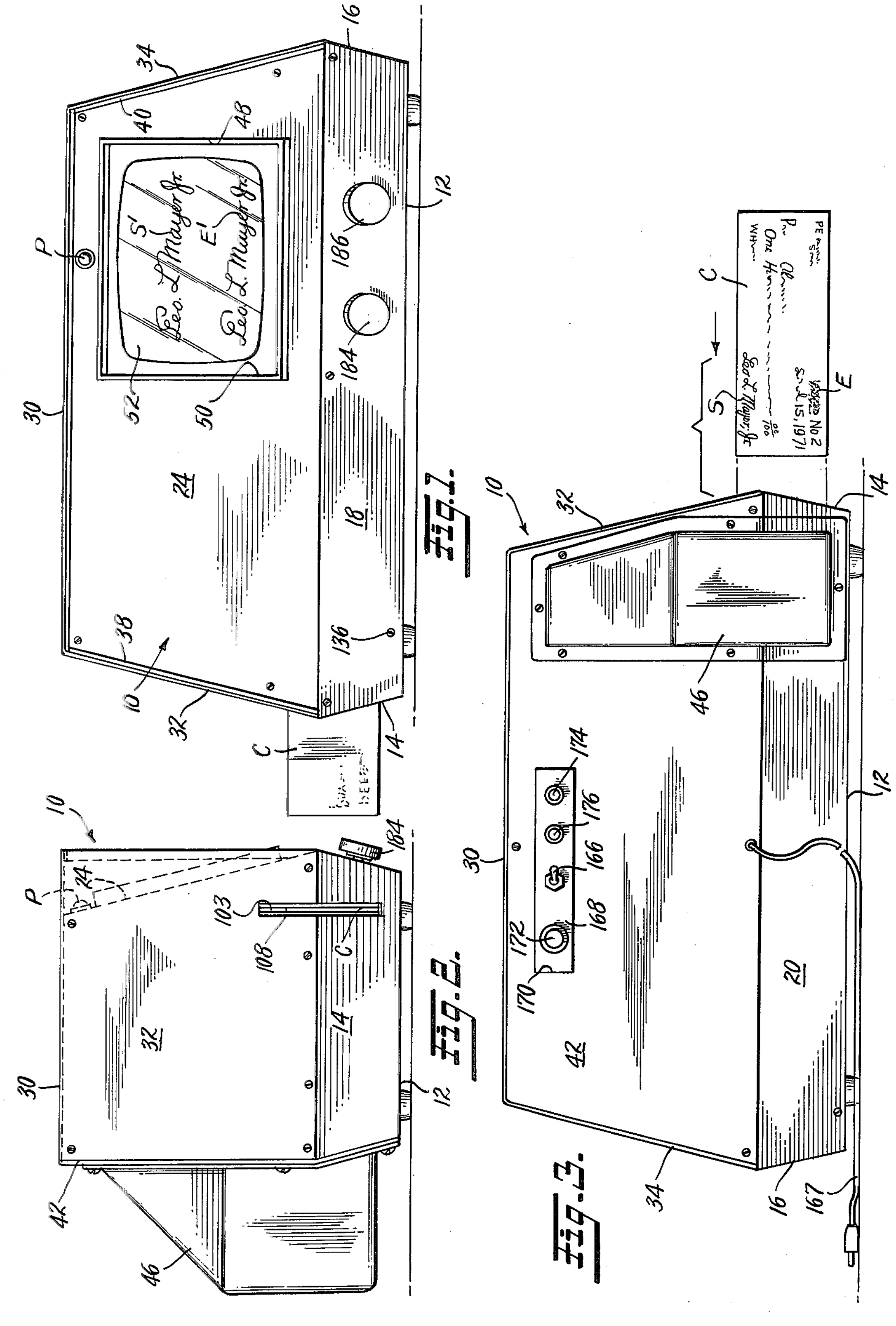
FIG. 1 is a front elevational view of the decoder and video comparator apparatus of the present invention, and showing on the video screen the images of the decoded and hand-written signatures for comparison purposes.
FIG. 2 is a left side elevational view of the apparatus of FIG. 1, and particularly showing the slot in the end of the cabinet for receiving the signed check having the encoded signature.
FIG. 3 is a rear elevational view of the apparatus shown in FIGS. 1 and 2 illustrating in dot-and-dash lines a signed check in position for insertion into the check slot.

Referring to the drawings, the components of the present video decoder and comparator are contained within a metallic cabinet generally identified by the numeral 10. The cabinet 10 may be constructed in any manner desired, but as shown comprises a bottom wall 12 having upwardly diverging side wall portions 14 and 16. Outwardly diverging front and rear wall portions 18 and 20, respectively, also extend from the bottom wall 12. A horizontal partition 22 is secured at one end to the side wall portion 16, and to the front wall portions 18 and 20 in any suitable manner, as by angle members and nuts and bolts. An upwardly and rearwardly inclined front wall 24 is secured by an angle member 26 to the front wall portion 18 so as to form a continuation of the said front wall portion. An inverted U-shaped member provides a top wall portion 30 for the cabinet and downwardly and outwardly diverging side wall portions 32 and 34 that form continuations of the side wall portions 14 and 16, respectively. The upper end of the front wall 24 is secured at 36 to the top wall 30, and is secured by angle members 38 and 40 to the side wall portions 32 and 34, respectively. The rear of the cabinet is closed by a wall 42 that forms a continuation of the rear wall portion 20. Wall 42 has an opening 44 to accommodate television cameras 1 and 2, which are enclosed by a hood 46 mounted on the rear wall portions 20 and 42. The front wall 24 has an opening 48 to receive the front end of a monitor, or television set, 50 having its picture tube 52 visible through the opening.

Figures 5, 7, 8, 9:
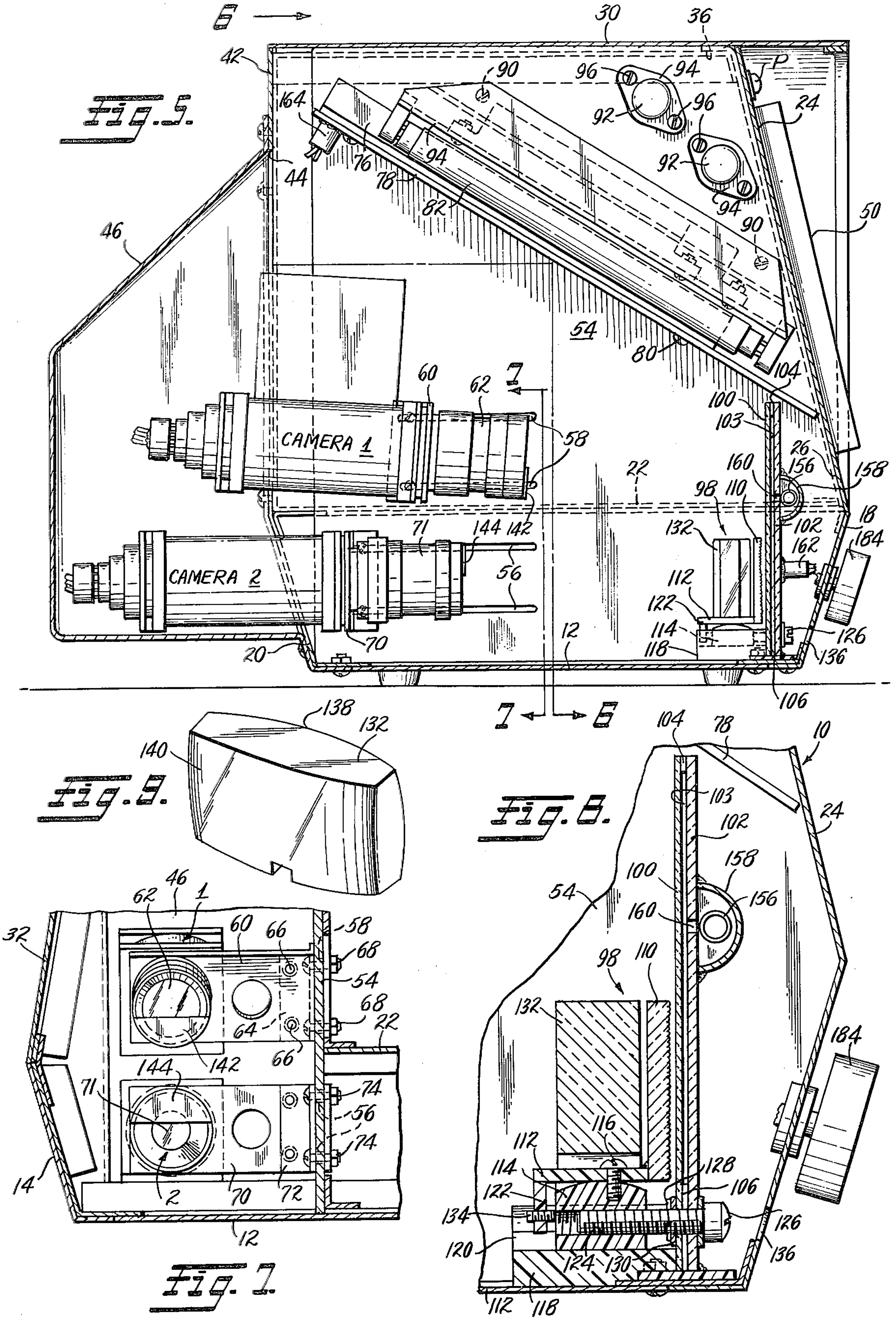
FIG. 5 is a vertical sectional view, taken on the line 5—5 of FIG. 1, but with the cover in place, particularly showing the signature decoding and magnifying unit and the two television cameras associated therewith.
FIG. 7 is a vertical, fragmentary cross-sectional view, taken on the line 7—7 of FIG. 5, particularly showing the adjustable mounting means for the two television cameras.
FIG. 8 is an enlarged fragmentary vertical sectional view, taken on the line 8—8 of FIG. 6, showing the adjustment assembly for the signature decoding and magnifying unit.
FIG. 9 is a perspective view of the magnifying lens shown in FIG. 8.
Figure 6:
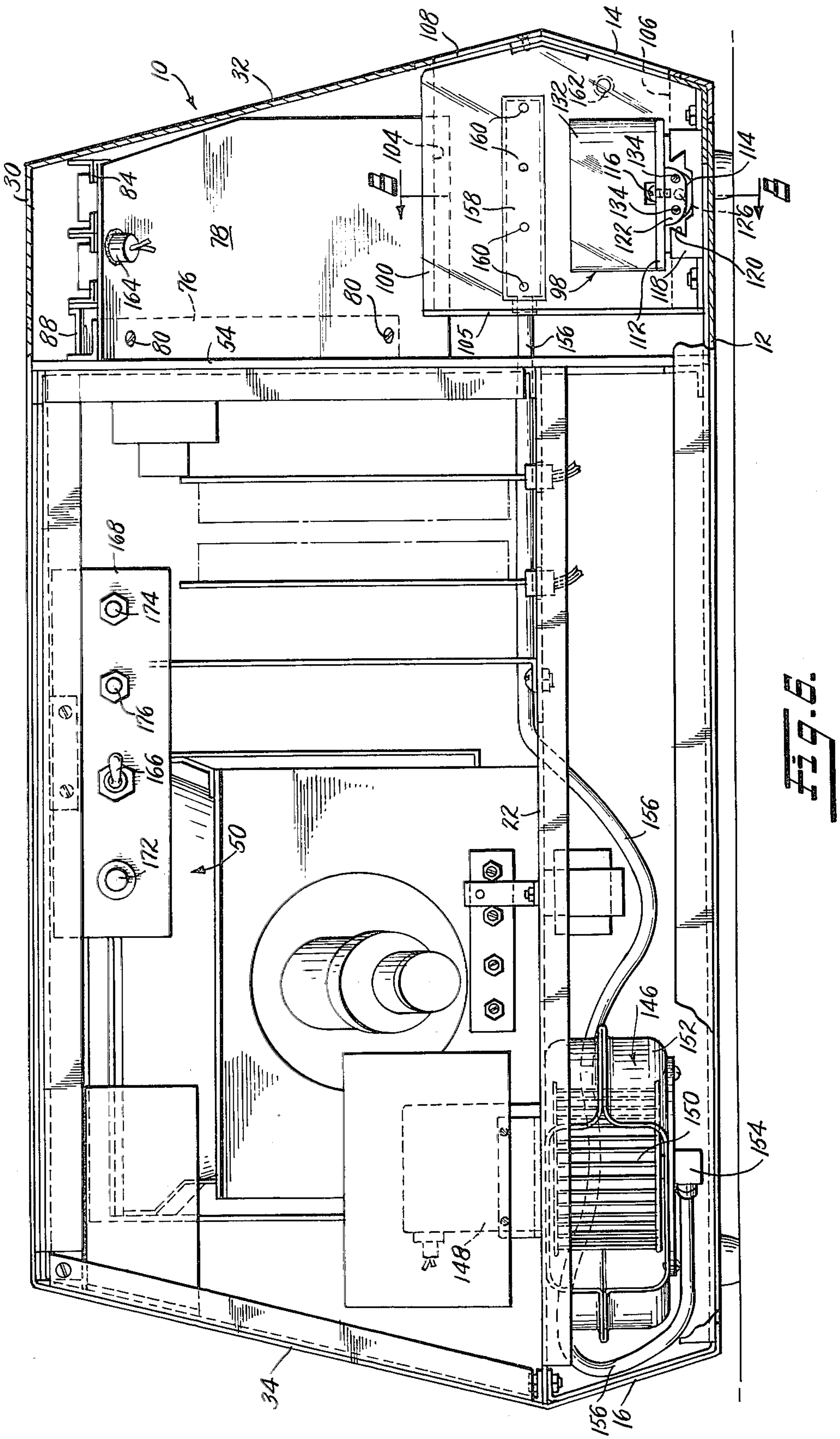
FIG. 6 is a rear elevational view of the apparatus with the rear wall of the cabinet removed, and with portions shown in cross section, taken substantially on the line 6—6 of FIG. 5.

The television set 50 can be mounted in any convenient and suitable manner in the cabinet 10. The cabinet 10 also contains a vertical partition 54 that extends from the bottom wall 12 to the top wall 30 at the left-hand portion of the cabinet. As is shown in FIG. 6, the other end of the horizontal partition 22 terminates at the partition 54 and is secured thereto. The partition 54 has two pairs of horizontal slots 56 and 58, FIG. 5, for mounting the television cameras 1 and 2. As is best shown in FIG. 5, the television camera 1 is mounted above the television camera 2. Both cameras are conventional and, by way of example, may be Concord Model No. MTC-12, but it is to be understood that any suitable television camera can be used. The camera 1 has a zoom lens with a lens designation of 1:1.5–8.5 mm. The television camera 2 has a lens designation of 1:1.5–25 mm. Here again, the lenses are by way of example only, and not by way of limitation, since other suitable lenses can be used in carrying out the principles of the invention.

A flat mounting plate 60 is secured to the housing of the television camera 1 rearwardly of its lens 62. An angle member 64 has one leg thereof secured to the plate 60 by bolts 66. The other leg of the angle member 64 carries bolts 68 that extend through the slots 58 secure the television camera 1 in proper adjusted position on the partition 54. The television camera 2 has a similar plate 70 secured thereto rearwardly of its lens 71 with an angle member 72 similarly mounted on the plate and having bolts 74 extending through the slots 56 and adjustably positioning the television camera 2 on the partition 54. The cameras 1 and 2 are adjusted relative to the areas they scan so that proper size and in-focus images are produced by the cameras.

An angle strip 76 is mounted on the partition 54 above the television camera 1 and is disposed on an angle of about 30° to the horizontal, although this angle is not critical. A translucent wall 78 is secured by bolts 80 to the angle strip 76. Mounted above the translucent wall 78 and in spaced relation thereto are two fluorescent lamps 82, one of which is mounted below a channel member 84 and the other of which is mounted below a channel member 86, the channels being arranged side by side and welded or otherwise connected. The channel member 86 is connected by another channel member 88 to the vertical partition 54 by bolts 90. Thus, the fluorescent lamps 82 comprise a subassembly that can be readily removed when replacement of a lamp is necessary. It is to be understood that fluorescent lighting is not critical and that any suitable lamps can be used.

The fluorescent lamps 82 have conventional starter elements 92 connected therewith by wiring (not shown). Each of the starter elements 92 is mounted on a base 94 that is secured to the vertical partition 54 by screws 96. It is to be understood that the fluorescent lamps 82 provide illumination for the television cameras 1 and 2 and the matter scanned thereby.

Disposed within the cabinet 10, in alignment with the television cameras 1 and 2 and below the fluorescent lamps 82, is a decoding unit generally identified by the numeral 98 and shown on an enlarged scale in cross section in FIG. 8. The decoding unit 98 comprises a pair of clear "plexiglass" plates, 100 and 102, that confront each other and are held apart at their upper ends by a spacer strip 104 and at their lower ends by a similar but wider spacer strip 106. The plates 100 and 102 are vertically aligned with a slot 108 formed in the side wall portions 14 and 32 of the cabinet 10. The ends of the plates 100 and 102 adjacent to the slots 108 are flared in a direction away from each other so as to provide for ready insertion of a check C into a space 103 therebetween for scanning by the television cameras 1 and 2. A strip 105, FIG. 4, at the inner end of the plates 100 and 102 serves as a stop for the inserted end of the check C.

The check C must be of less height than the vertical distance between the spacer strips 104 and 106, and normally will rest in a horizontal position on the upper edge of the spacer strip 106. As is shown in FIG. 3, the check C is inserted into the slot 108 in an inverted position so that the signature end of the check enters the space 103 first. The check C contains an encoded signature E that is unreadable and which may be imprinted on the check in accordance with the method and apparatus described in our prior application, Ser. No. 103,204. The check C will also normally contain a handwritten signature S of the payor. As is described in the aforesaid application, the encoded data or signature E is obtained through the use of a "fly's eye" lens, the image of which is photographed and then printed on the check C. The encoding is normally done on a reduced scale, say, half the size of the original signature. Hence, the encoded portion E occupies less space on the check C than the handwritten signature S. As is also described in the aforesaid application, the encoded signature E can be readily decoded by employing a similar "fly's eye" lens. Consequently, the present decoding unit 98 includes such "fly's eye" lens 110 arranged in parallel, but spaced, relation to the transparent plate 100, which serves as a window. The "fly's eye" lens 110 is also positioned so that its array of lenslets confronts the encoded signature E on the check C when the check is inserted through the slot 108 into the space 103 between the plates 100 and 102. The lenslet side of the lens 110 is one focal length, and its plain side is two focal lengths, away from the check C.

The "fly's eye" lens 110 is adhesively secured to the forward edge of a plastic strip 112. The strip 112 is secured to a block 114 by a screw 116. Block 114 is mounted for sliding movement in a base 118 secured to the bottom wall 12 and having a dovetailed shape groove 120. The block 114 is complementary in shape to the groove 120 and fits snugly within the groove. The plastic strip 112 has a downwardly extending tab 122 at its inner end located centrally of the block 114. The block 114 has a threaded opening 124 to receive an adjusting screw 126. The screw 126 extends through aligned openings in the plate 102, the the spacer 106 and the plate 100, and is free to rotate therein. A cotter pin 128 extends through the shank of the screw 126 and bears against a washer 130 engaged with the plate 100 to prevent longitudinal movement of the screw.

A magnifying lens 132 is cemented to the plastic strip 112 in parallel relation to the plain face of the "fly's eye" lens 110. The lens 132 is grooved centrally so as to accommodate the head of the screw 116. The upper portion of the block 114, engaged by the plastic strip 112, is convex in cross section so that the plastic strip 112 can be angularly adjusted relative to the block. In order to facilitate such adjustment, the tab 122 has a pair of adjustng screws 134 mounted therein so that one end thereof abuts the adjacent side of the block 114. The adjusting screws 134 are mounted one upon either side of the screw 126, so that the "fly's eye" lens 110 can not only be adjusted vertically in parallel relation to the window plate 100, but can also be adjusted in parallel, horizontal relationship thereto. The distance between the lenslets on the "fly's eye" lens 110 and the encoded signature on the check C can be adjusted by turning the screw 126 to move the block 114, and the assembly of the "fly's eye" lens 110 and magnifying lens 132 carried thereby, forwardly or rearwardly relative to the check C to afford sharp focus. The front wall portion 18 of the cabinet 10 has an opening 136 providing access to the head of the screw 126 for adjusting purposes.

As is best shown in FIG. 9, the magnifying lens 132 has concave front and rear faces 138 and 140, respectively. Assuming that the encoded signature on the check C has been reduced to half-size during encoding, the magnification of the lens 132 is such as to restore the image of the decoded signature appearing on the plain side of the "fly's eye" lens 110 to approximately twice its size, so that the television camera 2 scans an image of substantially the same scale as the handwritten signature S scanned by the television camera 1.

In order to assure transmission of only the decoded signature C and the handwritten signature S for aesthetic purposes only, a portion of each of the lenses of the television cameras 1 and 2 is obstructed by adhesively securing a piece of opaque material to the front edge of the lens holder. Thus, a substantially semicircular blocking member 142 is secured to the lens 62 of the television camera 1, obstructing almost the lower half thereof, and a similar blocking member 144 is fastened to the upper portion of the lens 71 of the television camera 2, obstructing almost the upper half thereof.

Figure 4:
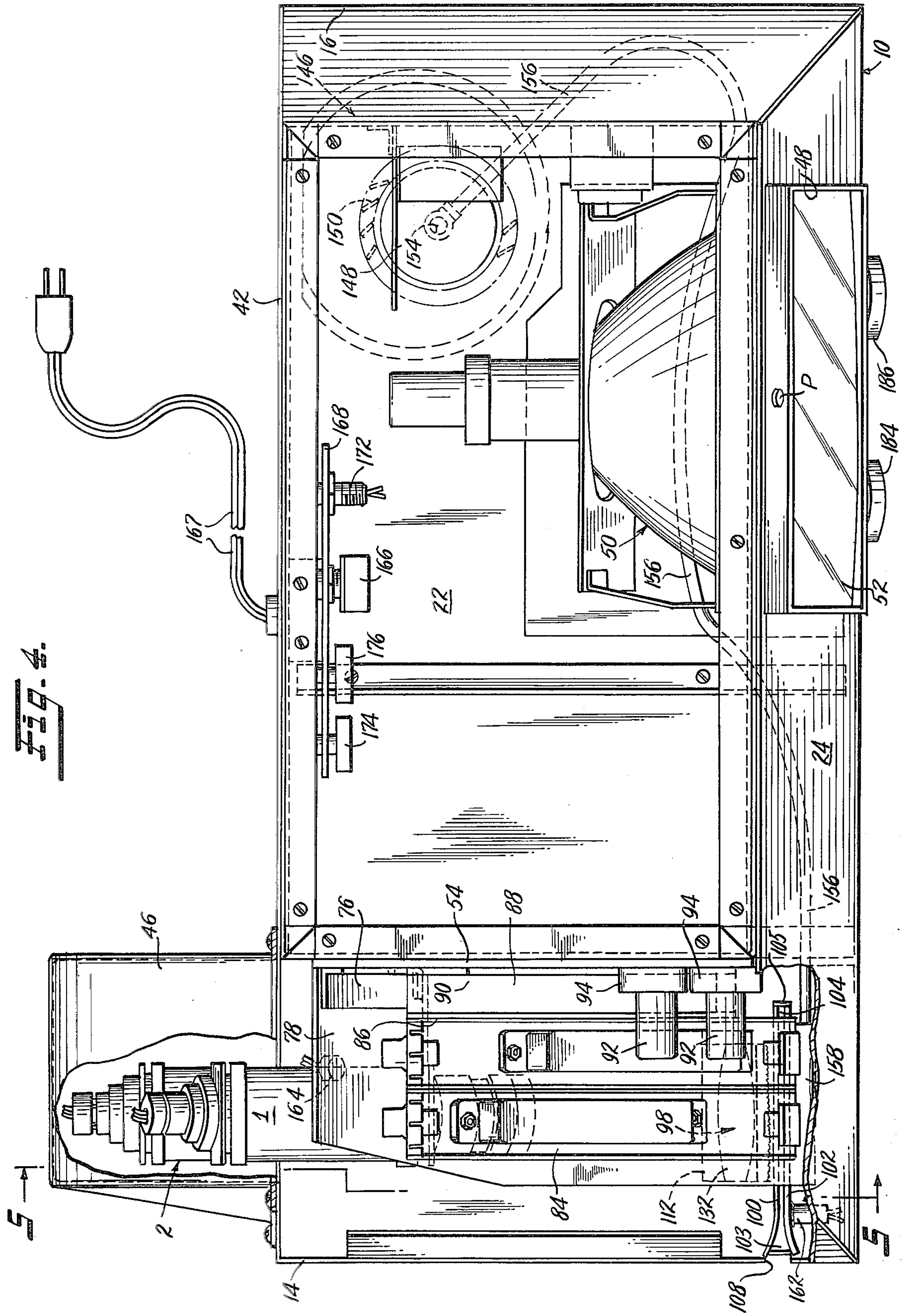
FIG. 4 is an enlarged plan view with the cabinet cover removed and other parts shown in cross section to illustrate the relative positions of the various components in the cabinet.

Referring to FIGS. 4 and 6, a suction pump or blower 145 is mounted within the cabinet 10 upon the horizontal partition 22. The pump 146 comprises a motor 148 disposed above the partition 22 and an impeller 150 mounted in a housing 152 disposed below the partition 22. The pump 146 has an intake 154 to which one end of a flexible tube 156 is connected, the other end being connected to one end of a plastic housing 158 adhesively secured to the front side of the plate 102. The housing 158 is semicylindrical in cross section and is closed at its other end by an end wall. The plate 102 has a series of four openings 160 that establish communication between the interior of the housing 158 and the space 103 between the plates 100 and 102. The purpose of the openings 160 and the pump 146 is to create a suction in the space 103 between the plates 100 and 102 to draw the check C against the inner side of the plate 102 so as to hold it in proper spaced relation to the "fly's eye" lens 110. The plate 102 thus serves as a backing plate for the check C.

An electric eye 162 is mounted upon the plate 102 and is connected in a circuit with the monitor 50 and controls the supply of line current thereto through a delay (not shown). The electric eye 162 is positioned near the outer end of the space 103 between the plates 100 and 102, and is automatically operative to energize the relay to complete the circuit to the montior 50 as a check C is inserted into the space 103 and interrupts the light from the lamps 82 acting on the electric eye 162. The television cameras 1 and 2 are operative at this time and transmit video signals to a conventional video signal mixer 163, FIG. 10, the combined video signals from which are conducted to the monitor 50, as will be explained more fully hereinafter.

A second electric eye 164 is mounted on the translucent plate 78 adjacent its upper end, FIG. 5. The electric eye 164 is responsive to the lamps 82 and controls the supply of current to the television cameras 1 and 2. The electric eye 164 is connected with a relay (not shown) that completes the circuit to the television cameras 1 and 2 and maintains the circuits so long as the lamps 82 are turned on. Thus, the television camera tubes are supplied with electrical current only if the lamps 82 are on; otherwise, the vidicon tubes would be damaged because of the excessively high current flow through the tubes under inadequate lighting conditions. The electric eye 164 provides a "fail safe" feature damage to the cameras 1 and 2 if the lamps 82 are not turned on.

The television cameras 1 and 2 run continuously so long as the lamps 82 are turned on. The suction pump 146 also runs continuously. The electrical current to the lamps 82 and to the motor 148 of the suction pump is controlled by a main switch 166 mounted on a plate 168 secured to the rear of the well 42 inwardly of an opening 170 in said wall. Electrical current is supplied to the apparatus by a cord 167 connected to the switch 166. A pilot light P on the cabinet 10 is turned on when the switch 166 is closed. A fuse 172 is also mounted on the plate 168 and serves to prevent overloading of the supply circuit. Conventional potentiometer controls 174 and 176 are associated with the eyes 162 and 164, respectively, to control their sensitivity, as is well understood in the art.

Figures 10, 11:
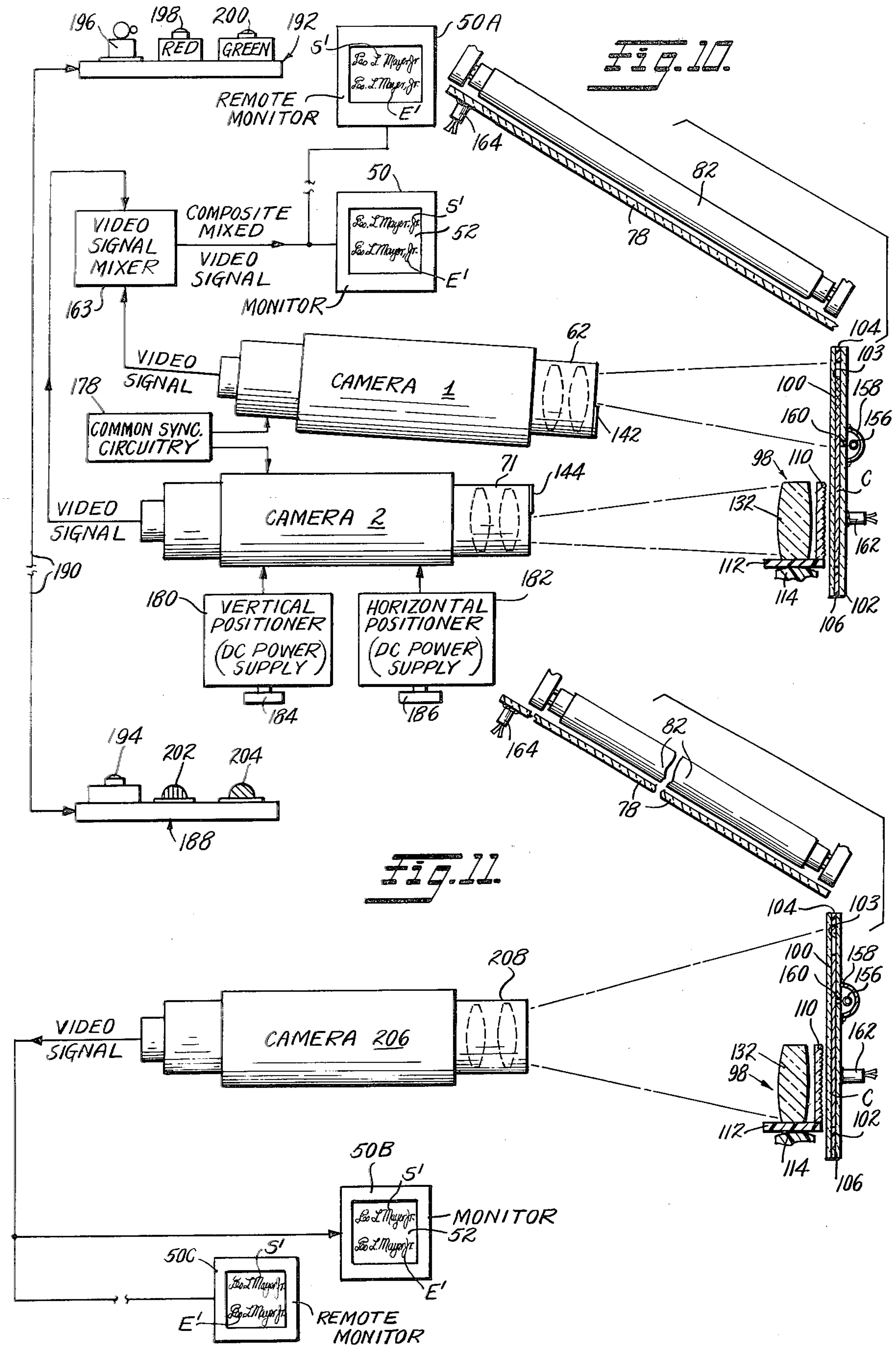
FIG. 10 is a schematic view of the principal components of the apparatus.
FIG. 11 is a schematic view of a modified form of apparatus, embodying one television camera instead of two.

FIG. 10 is a schematic view of the principal components of the present apparatus, with the electrical connections and conventional components omitted in the interest of clarity, it being understood that persons skilled in the art will readily be able to provide and interconnect the components in various operable circuits that will achieve the objectives of the invention.

It will be understood that the camera 1 scans the handwritten signature S, and the camera 2 scans the encoded signature E as decoded by the "fly's eye" lens and presented through the magnifying lens 132. Cameras 1 and 2 are interconnected by a common sync circuit diagrammatically indicated at 178 so that the cameras 1 and 2 start simultaneously and scan the objectives at the same rate, in synchronism. The video output of each camera is connected with the conventional video signal mixer 163 to provide a composite mixed video output signal with a single sync signal, which is fed to the video input of the television set or monitor 50. This eliminates the need for the audio and IF portions of the television set.

The camera 2 has two conventional external D.C. power supplies connected to the horizontal and vertical deflection coils thereof. The vertical positioner is indicated at 180 and the horizontal positioner at 182. It will be understood that these are controlled by knobs 184 and 186, respectively, at the front of the cabinet 10. The D.C. power supplies 180 and 182 are capable of outputting both positive and negative voltage, thus allowing horizontal and vertical positioning up, down and sideways of one of the signature images, in this case the image of the decoded signature S′ as it appears on the screen, FIG. 1. This horizontal and vertical positioning, therefore, allows superimposing of the decoded signature over the handwritten signature E′ as it appears on the video screen 52. The horizontal and vertical positioners could just as easily be connected with camera 1, rather than camera 2, in which event it would be possible to superimpose the image of the handwritten signature S′ over the image of the decoded signature E′ on the video screen.

The mixed video signal can be connected with a remotely located monitor 50A, which may be located in a signature card file room of a bank, or elsewhere, so that the same images shown on the monitor 50 can be simultaneously viewed on the monitor 50A. A signal device 188, conveniently located to the teller, is connected by suitable wiring 190 to another signal device 192 adjacent the remotely located monitor 50A. The teller signaling device 188 includes a doorbell type switch 194 that can be pressed by the teller to energize a buzzer 196 on the remote signaling device 192 to alert an attendant to view the screen of the monitor 50A, or to turn the monitor on if it is not in operation. The attendant can then compare the image of the handwritten signature S′ on the screen of the monitor 50A with a signature card. The remote signaling device 192 includes two doorbell type switches, one indicated at 198 and another at 200. The teller signaling device 188 includes a red signal lamp 202 and a green signal lamp 204. The switch 198 is connected with the red lamp 202 and the switch 200 is connected with the green lamp 204, so that the attendant at the remote monitor can signal the teller by actuating either one of the switches 198 or 200 to illuminate the red or green lamp to indicate to the teller that the check is acceptable or should be rejected.

FIG. 11 schematicaly illustrates apparatus for decoding and presenting for comparison a decoded signature and a handwritten signature, utilizing a single television camera 206. As is shown, the axis of the lens system 208 of the camera 206 is positioned so that it lies centrally of the area scanned by the camera, which area includes both the decoded and magnified signature as seen through the magnifying lens 132, and the handwritten signature as seen through the window 100. The video signal of the camera 206 is transmitted to the video input of a television set or monitor 50B, whereby the images of the decoded and handwritten signatures are reproduced on the video screen of the monitor 50B.

It will be understood that the video signal from the single television camera 206 can also be connected with a remote monitor 50C, and also be associated with signaling devices similar to the teller signaling device 188 and the remote signaling device 192, shown in FIG. 10.

It will also be understood that the term "data," as used herein, is intended to include all that can be decoded by the present method and apparatus.

It will be understood that various changes may be made in the components of the apparatus and in the arrangment thereof without departing from the principles of the invention or the scope of the annexed claims.

We claim:

1. The method of decoding encoded, recorded data comprising an array of discrete images obtained by the use of a fly's eye lens for comparison with other data, comprising the steps of: decoding the encoded data and producing an image thereof by positioning a similar fly's lens in confronting relation to the encoded data; simultaneously scanning, with television camera means, said decoded image and the data to be compared therewith; and transmitting the video signals from said camera means to a television set to visually present a picture of the decoded image and the matter to be compared therewith on the screen of said television set.

2. The method as defined in claim 1, including the steps of: providing illumination for the camera means; continuously operating the camera means while illuminated; and interrupting the operation of the camera means upon failure of the illumination.

3. The method defined in claim 1, wherein the encoded data is that of a handwritten signature, and the matter to be compared therewith is a handwritten signature, includng the step of: making a comparison of the images of the two signatures.

4. The method as defined in claim 1, wherein the encoded data comprises a printed record of an array of discrete images and wherein the image scanned by the camera means is the decoded image appearing on the side of the fly's eye lens remote from the encoded data.

5. The method as defined in claim 4, including the step of: interposing a magnifying lens between the fly's eye lens and the lens of the camera means.

6. The method as defined in claim 4, including the step of: enlarging the image on the fly's eye lens to approximately the same size as that of the original uncoded data at the time of encoding, and wherein the image scanned by the camera means is the enlarged image.

7. The method defined in claim 4, including the step of: holding the encoded data and the data to be compared therewith in fixed position relative to the fly's eye lens and the camera means.

8. The method as defined in claim 4, wherein the encoded data and the data to be compared therewith are on the same document; and applying suction to one side of the document to hold it in place with respect to the fly's eye lens and the camera means.

9. The method as defined in claim 1, wherein the camera means comprises two cameras, one to scan the decoded data and the other to scan the material to be compared therewith, and including the steps of: mixing the video signals from the two cameras; and transmitting the composite video signal to the video input of the television set for simultaneous viewing of images of the camera outputs on the screen of said television set.

10. The method as defined in claim 9, including the step of: shifting one image relative to the other to facilitate comparison.

11. The method as defined in claim 10, including the step of: superimposing one image in overlying relation on the other on the television screen.

12. The method defined in claim 1, including the step of: simultaneously transmitting the same video signals of the camera means to the video input of a remotely located television set.

13. The method defined in claim 12, including the step of: sending a signal to the area of the remotely located television set to call attention to the images being transmitted to the screen of said remotely located television set.

14. The method defined in claim 13, including the step of: sending a signal from the area of the remote television set to the area of original image transmission to indicate identity or non-identity of the images being transmitted.

15. Video apparatus for decoding recorded encoded data for visual comparison with non-encoded data, comprising: television camera means; means for holding the encoded data and non-encoded data for simultaneous scanning by said camera means, said encoded data comprising an array of discrete images; decoding means between said encoded data and camera means for presenting an image of the decoded data to said camera means; a television set having a viewing screen; and means connected to transmit the video signals of said decoded data and said non-encoded data from said camera means to the video input of said television set for presenting the matter scanned by said camera means for viewing on the television screen.

16. Video apparatus as defined in claim 15, including magnifying means disposed between the decoding means and the television camera means for enlarging the decoded data to approximately its initial size.

17. Video apparatus as defined in claim 15, wherein the means for decoding the encoded data is a lens similar to that employed in encoding said data.

18. Apparatus as defined in claim 15, in which the decoding means is a fly's eye lens having a plain side and a side provided with lenslets, and having its lenslet side disposed closest to the encoded data, and having its plain side confronting the television camera means.

19. Apparatus as defined in claim 15, including a cabinet; a partition in said cabinet; and means adjustably mounting the television camera means on said partition.

20. Apparatus as defined in claim 15, including at least one additional television set at a remote point; and means connected to transmit the video signals from said television camera means to said remote television set.

21. Apparatus as defined in claim 20, including signal means arranged between the areas of the two television sets for sending signals back and forth between said areas.

22. Video apparatus as defined in claim 15, wherein the camera means includes two television cameras, one of said cameras being positioned to scan the decoded data and the other positioned to scan the data to be compared therewith; a video mixer; means connected to transmit the video signals from the two cameras to the video mixer; and means connected to transmit a composite video signal from the mixer to the television set for simultaneous presentation of images on the viewing screen of the matter scanned by the two television cameras.

23. Video apparatus as defined in claim 22, including means for horizontally and vertically shifting one of the images on the television screen relative to the other.

24. Apparatus as defined in claim 22, including a cabinet contaiing a partition, and wherein the two television cameras are adjustably mounted on the partition one above the other.

25. Apparatus as defined in claim 24, in which the lower portion of the lens of the upper camera is obstructed and in which the upper portion of the lens of the lower camera is obstructed to limit the areas scanned by the television cameras to the decoded data and the matter to be compared therewith.

26. Apparatus as defined in claim 15, wherein the decoding means is a lens comprising an element of a decoding unit, and wherein the lens is arranged to confront encoded matter on a document, said lens having the lenslet side thereof spaced one focal length away from said document and its plain side disposed in confronting relation to the television camera means.

27. Apparatus as defined in claim 26, in which decoding unit comprises a base; a block slidably mounted upon said base, said decoding lens being supported by said block; and means connectd with that block for adjusting said decoding lens toward and away from the document containing the encoded material.

28. Apparatus as defined in claim 26, in which the decoding unit includes a strip pivotally mounted upon the block, and wherein the decoding lens is mounted upon said strip; and adjusting means carried by said strip for adjusting the same relative to said block for positioning the decoding lens in parallel relation to the document containing the encoded data for sharp focusing.

29. Apparatus as defined in claim 26, wherein the decoding unit comprises a strip having the decoding lens mounted thereon and also having a magnifying lens mounted adjacent to the decoding lens for enlarging the image of the decoded data appearing upon the side of the decoding lens adjacent to said magnifying lens.

30. Apparatus as defined in claim 26, wherein the decoding unit comprises a movable block having the decoding lens mounted thereon; and means for adjusting the decoding lens both horizontally and vertically relative to the encoded data appearing on the document.

31. Apparatus as defined in claim 30, including means for moving the decoding lens and magnifying lens toward and away from the document containing the encoded data.

32. Apparatus as defined in claim 31, including a light source positioned to illuminate the television camera means, the encoded data, and the data to be compared therewith while being scanned by said television camera means.

33. Apparatus as defined in claim 32, in which the light source comprises lamps positioned above the decoding unit and above the television camera means.

34. Apparatus as defined in clam 32, including an electric eye responsive to the light source, said electric eye being arranged to control current to the television camera means so that with light present the camera means is rendered operative, and in the absence of light the camera means is rendered inoperative.

35. Apparatus as defined in claim 31, including a cabinet having a slot in one wall thereof to receive a document containing encoded data; means within the cabinet adjacent to said slot comprising two plates spaced apart to receive the document therebetween, and an electrical eye carried by one of said plates and connected in circuit with said television set for activating said set upon the insertion of said document in the space between said plates.

36. Apparatus as defined in claim 35, wherein one of the plates between which the document is received has a plurality of openings formed therein; a closed housing mounted upon said one plate and overlying said openings; a suction pump having an intake; and a conduit connecting said housing with the intake of such suction pump for holding said document against said one plate.

37. Apparatus as defined in claim 36 wherein the cabinet includes a horizontal partition, and the suction pump is mounted upon said horizontal partition.

38. The method of decoding encoded, recorded matter comprising an array of discrete images obtained by the use of a fly's eye lens, comprising the steps of: decoding the encoded matter and producing an image thereof by positioning a similar fly's eye lens in confrontng relation to the encoded matter; scanning the image of the decoded matter with television camera means; and transmitting the video signals from said television camera means to a television set to visually present a picture of the decoded image on the screen of the television set.

39. The method defined in claim 38, including the step of: simultaneously transmitting the same video signals of the television camera means to the video input of at least one other television set that is remotely located relative to the first-mentioned television set.

40. Video apparatus for decoding recorded, encoded matter, comprising: television camera means; means for holding the encoded matter for scanning by said television camera means, said encoded matter comprising an array of discrete images; decoding means between said encoded matter and said television camera means for presenting an image of the decoded matter to said television camera means; a television set having a viewing screen; and means connected to transmit the video signals of said decoded matter from said television camera means to the video input of said television set for presenting the decoded matter scanned by the television camera means for viewing on the television screen.

41. Apparatus as defined in claim 40, including at least one additional television set located at a remote point; and means connected to transmit the video signals from said television camera means to said remote television set.

* * * * *